(12) United States Patent
Park et al.

(10) Patent No.: US 8,872,082 B2
(45) Date of Patent: Oct. 28, 2014

(54) FLYING OBJECT HAVING ONE BODY WINGS

(71) Applicants: Sung Han Park, Daejeon (KR); Kyung Yong Lee, Daejeon (KR); Yeung Cheol Kim, Daejeon (KR); Kyoung Tai Kang, Daejeon (KR)

(72) Inventors: Sung Han Park, Daejeon (KR); Kyung Yong Lee, Daejeon (KR); Yeung Cheol Kim, Daejeon (KR); Kyoung Tai Kang, Daejeon (KR)

(73) Assignee: Agency for Defense Development, Daejeon (KR)

( * ) Notice: Subject to any disclaimer, the term of this patent is extended or adjusted under 35 U.S.C. 154(b) by 135 days.

(21) Appl. No.: 13/778,905

(22) Filed: Feb. 27, 2013

(65) Prior Publication Data

US 2014/0116281 A1     May 1, 2014

(30) Foreign Application Priority Data

Oct. 25, 2012 (KR) .................. 10-2012-0119221

(51) Int. Cl.
    *B64C 1/26*        (2006.01)
    *F42B 10/06*       (2006.01)
    *F42B 15/10*       (2006.01)

(52) U.S. Cl.
CPC . *B64C 1/26* (2013.01); *F42B 15/10* (2013.01); *F42B 10/06* (2013.01)
USPC ........................................ 244/3.24; 244/3.25

(58) Field of Classification Search
USPC .......... 244/3.24, 3.25, 3.26, 3.27, 3.28, 3.29, 244/3.3
See application file for complete search history.

(56) References Cited

FOREIGN PATENT DOCUMENTS

| | | |
|---|---|---|
| JP | 2001-140746 A | 5/2001 |
| JP | 2012-047142 A | 3/2012 |
| KR | 10-2006-0000626 A | 1/2006 |

*Primary Examiner* — Benjamin P Lee
(74) *Attorney, Agent, or Firm* — Scully, Scott, Murphy & Presser, P.C.

(57) ABSTRACT

Disclosed is a flying object in which a covering unit and a wing unit installed in a nozzle assembly are integrally formed to form a smooth outer surface of the flying object, thus minimizing drag, and the covering unit and the nozzle assembly are fastened by using a fastening member having one end fastened to a slit, thereby preventing the flying object from being damaged by thermal deformation.

15 Claims, 3 Drawing Sheets

FLYING OBJECT HAVING ONE BODY WINGS

CROSS-REFERENCE TO RELATED APPLICATION

Pursuant to 35, U.S.C. §119(a), this application claims the benefit of earlier filing date and right of priority to Korean Application No. 10-2012-0119221, filed on Oct. 25, 2012, the contents of which is incorporated by reference herein in its entirety.

BACKGROUND OF THE INVENTION

1. Field of the Invention

The present disclosure relates to a flying object having wings formed in one end of a body.

2. Background of the Invention

In order to maintain flying stability of a flying object such as a guide missile, a rocket, or the like, a control fin and a tail wing are installed in a main body of the flying object. In general, the tail wing is disposed to be adjacent to a nozzle assembly providing propulsive force of the flying object, and a plurality of tail wings are formed to maintain balance of the flying object.

The tail wing installed in the flying object may be classified into a foldable tail wing and a fixed tail wing. The foldable tail wing may be installed when a size of a launch tube is limited, and fastened to a processed recess of a nozzle structure of a propulsion engine by using a circular bar, or the like. The wing is folded or unfolded by a spring, or the like, installed in the tail wing.

A shaft-insertion fastening method for fastening the foldable tail wing to the nozzle structure is simple, but a space in which the wing is folded and developed is required. Thus, a free surface of the nozzle structure has no choice but to be bent, and thus, additional drag may be generated.

Also, because latent heat due to combustion of a propellant by the propulsion engine is transmitted to the nozzle structure and directly conducted to the tail wing installed in the nozzle structure, the nozzle assembly is required to have heat resistant characteristics. In case of fabricating the nozzle assembly to have improved heat resistance characteristics, the nozzle assembly is inevitably increased in weight.

Meanwhile, the fixed tail wing may be applied when aerodynamics requirements are limited relative to the foldable tail wing. The fixed tail wing is fastened to a cylindrical covering by using a bolt. The wing is insertedly fixed to the covering, and the covering is bolt-fastened with a skirt.

When a cant angle and straightness of the wing should be strictly limited, it is difficult to precisely form tolerance of a structure in which the fixed wing is bolt-fastened with the covering. The cylindrical covering is simply bolt-fastened with the skirt and is simply supported by the skirt, so, in order to support aerodynamics, the covering unit and the fastening unit are required to have rigidity.

Thus, it is difficult to reduce weight of the covering. Thus, in case of a missile having a high slenderness ratio, the center of gravity is positioned in a rear side of the flying object after the propulsion engine is burned, reducing stability of the flying object. Also, the structure in which the wing is fastened or assembled to the covering has a problem in that components required for fastening or assembling are increased, fabrication costs are high, and a number of assembly processes is increased.

SUMMARY OF THE INVENTION

Therefore, an aspect of the detailed description is to reduce drag of a flying object and a weight of the flying object.

To achieve these and other advantages and in accordance with the purpose of this specification, as embodied and broadly described herein, a flying object includes a flying object body, a nozzle assembly, a covering unit, and a wing unit. The nozzle assembly is formed to discharge a burnt propellant in one direction in order to provide propulsion to the flying object body. The covering unit is formed to surround an outer circumferential surface of the nozzle assembly and at least one region thereof is fixed to the nozzle assembly. The wing unit is protruded from an outer surface of the covering unit in a direction crossing the one direction.

In an embodiment related to the present invention, the flying object further includes a combustion tube formed to burn the propellant by the nozzle assembly, and the combustion tube and the nozzle assembly are in contact to allow heat generated from the combustion pipe to be transmitted to the nozzle assembly.

In an embodiment related to the present invention, the flying object further includes a fixing member fastened to an outer circumferential surface of the nozzle assembly through the covering in order to fix the covering unit to the nozzle assembly.

In an embodiment related to the present invention, the fixing member is formed as a flat headed bolt, and an end portion of the fixing member is coplanar with the outer circumferential surface of the covering unit.

In an embodiment related to the present invention, the covering unit includes a fastening slit formed to be recessed in one direction from at least one end portion, and in order to limit the covering unit from being separated from the nozzle assembly in a direction perpendicular to the outer circumferential surface of the covering unit from the nozzle assembly, the covering unit further includes a fastening member penetrating the fastening slit and fastened to the outer circumferential surface of the nozzle assembly.

In an embodiment related to the present invention, a slit length extending in the one direction of the fastening slit is formed to be greater than a diameter of a cross section of the fastening member.

In an embodiment related to the present invention, the fastening slit includes a step portion protruded along an inner circumferential surface of the recess portion, and an end portion of the fastening member is formed to overlap with the step portion to fix the nozzle assembly and the covering unit.

In an embodiment related to the present invention, the end portion of the fastening member exposed to the outside of the covering unit by the fastening slot is coplanar with an outer circumferential surface of the covering unit.

In an embodiment related to the present invention, one end portion of the fastening slit is formed to be opened, and one region of the fastening member is exposed to the outside of the fastening slit.

In an embodiment related to the present invention, the fastening member is formed in one end portion of the covering unit, and the fixing member is formed to be spaced apart from the fastening member in the one direction and installed in the other end portion of the covering unit.

In an embodiment related to the present invention, the flying object further includes a case formed to surround the body unit of the flying object, wherein the nozzle assembly is installed in one end of the body unit and the covering is installed in one end of the case.

In an embodiment related to the present invention, the fastening member is formed to be adjacent to the case.

In an embodiment related to the present invention, the covering unit and the case are coplanar.

In an embodiment related to the present invention, the nozzle assembly has a cylindrical structure having an inner space, and includes at least one fastening protrusion formed to be protruded from an outer circumferential surface of the cylindrical structure and coupled to the fastening member.

In an embodiment related to the present invention, the fastening protrusion and the inner circumferential surface of the covering are disposed to be in contact, and in order to limit heat transmission from the nozzle assembly to the covering, a space is formed between the inner circumferential surface of the covering and the outer circumferential surface of the nozzle assembly.

In an embodiment related to the present invention, the covering and the wing unit are integrally formed according to an extrusion molding method.

Another aspect of the detailed description is to model an airburst mode by using a laser.

To achieve these and other advantages and in accordance with the purpose of this specification, as embodied and broadly described herein, an airburst modeling system includes a laser shooting unit, a laser detecting unit, and a determining unit. The laser shooting unit shoots a laser to a target spot set in an upper portion of a target such that a warhead explodes in the air to allow the target covered by an obstacle to be shot. The laser detecting unit is installed in the target and detects a laser reaching the upper portion of the target. The determining unit measures a distance between the laser target spot and the arrival spot of the laser detected by the laser detecting unit, and determines whether the target was shot by using the distance.

In an embodiment related to the present invention, the laser shooting unit includes a body unit and a laser shooter. The body unit includes a trigger. The laser shooter is installed in the body unit and shoots a laser by the trigger.

In an embodiment related to the present invention, the laser shooter includes a pressure sensor for sensing pressure of a ball protruded by the trigger and pressurizing dummy ammunition, converting the pressure into a signal, and transmitting the signal to the laser shooter.

In an embodiment related to the present invention, the laser shooting unit includes a shooting noise generating unit for generating noise when the laser is shot.

In an embodiment related to the present invention, the airburst modeling system further includes a blank launched by the trigger and a shock sensing unit for sensing the launch of the blank.

In an embodiment related to the present invention, the laser shooting unit includes a global positioning system (GPS) and an electric compass.

In an embodiment related to the present invention, the laser sensing unit includes first and second cameras disposed to be spaced apart to capture an image of the laser at a distance from each other, and a posture sensing unit for measuring angles of the first and second cameras to the laser.

In an embodiment related to the present invention, the determining unit measures a distance between the target spot and the detected arrival spot of the laser and determines whether the target was shot by the distance and a pre-set reference distance.

In an embodiment related to the present invention, the determining unit includes a display unit for displaying whether the target was shot through at least one of an image and a sound.

In an embodiment related to the present invention, when a plurality of laser shooting is formed by the laser shooting unit, the determining unit determines by which of the plurality of lasers the target was shot by comparing points in time at which arrivals of the lasers were sensed and points in time at which the lasers were shot, comparing coordinates of the target position and coordinates of the laser target spot; and comparing a direction vector of the shot laser and the laser sensed by the laser sensing unit.

In an embodiment related to the present invention, a valid shooting number of laser that may be shot by the laser shooting unit is limited to a pre-set number. The determining unit determines that a laser shot in excess of the pre-set number is invalid.

To achieve these and other advantages and in accordance with the purpose of this specification, as embodied and broadly described herein, an airburst modeling method includes shooting a laser to a target spot set in an upper portion of a target such that a warhead explodes in the air to allow the target covered by an obstacle to be shot; being installed in the target and detecting a laser reaching the upper portion of the target; and measuring a distance between the target spot and the arrival spot of the laser and determining whether the target was shot by using the distance.

In an embodiment related to the present invention, the shooting of a laser to the target spot set in the upper portion of the target such that a warhead explodes in the air to allow the target to be shot includes putting the trigger to apply pressure to dummy ammunition, sensing pressure applied to the dummy ammunition and generating a signal, and shooting laser based on the signal.

In an embodiment related to the present invention, the shooting of a laser to the target spot set in the upper portion of the target such that a warhead explodes in the air to allow the target to be shot includes measuring a distance between the spot at which the laser is shot to the obstacle in order to estimate a distance to the target.

Further scope of applicability of the present application will become more apparent from the detailed description given hereinafter. However, it should be understood that the detailed description and specific examples, while indicating preferred embodiments of the invention, are given by way of illustration only, because various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1:
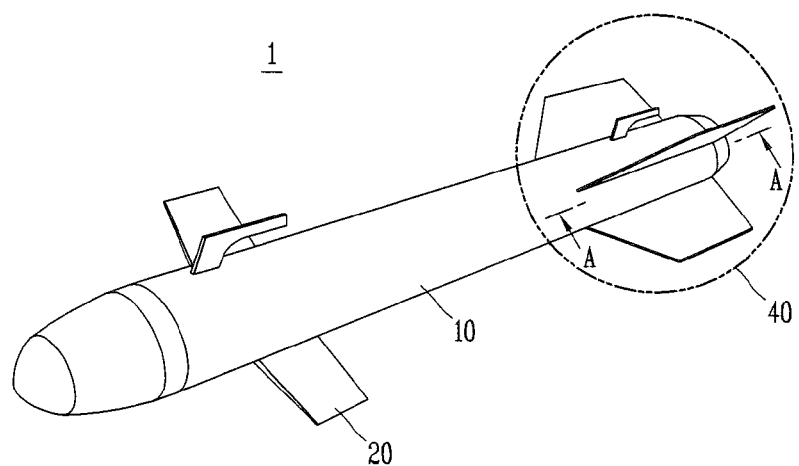
FIG. 1 illustrates a conceptual view of a flying object according to an embodiment of the present invention.

Description will now be given in detail of the exemplary embodiments, with reference to the accompanying drawings.

For the sake of brief description with reference to the drawings, the same or equivalent components will be provided with the same reference numbers, and description thereof will not be repeated.

Hereinafter, a flying object including a covering-integrated wing in relation to the present embodiment will be described in detail with reference to the accompanying drawings. In the present disclosure, the same or similar elements although they are in different embodiments are given the like or similar reference numerals and a description thereof will be replaced by a first description. Singular forms "a", "an" and "the" in the present disclosure are intended to include the plural forms as well, unless the context clearly indicates otherwise.

FIG. 1 illustrates a conceptual view of a flying object according to an embodiment of the present invention.

Referring to FIG. 1, a flying object 1 includes a body unit 10 extending in one direction, a control fin 20 installed to be adjacent to one end of the body unit 10, and a tail wing region 40 disposed on the other end portion of the body unit 10 and spaced apart from the control fin 20. According to an embodiment of the present invention, a wing unit of the tail wing region 40 is formed to be integrated with an outer surface of the body unit 10. Hereinafter, a structure of the wing unit will be described in detail.

Figure 2:
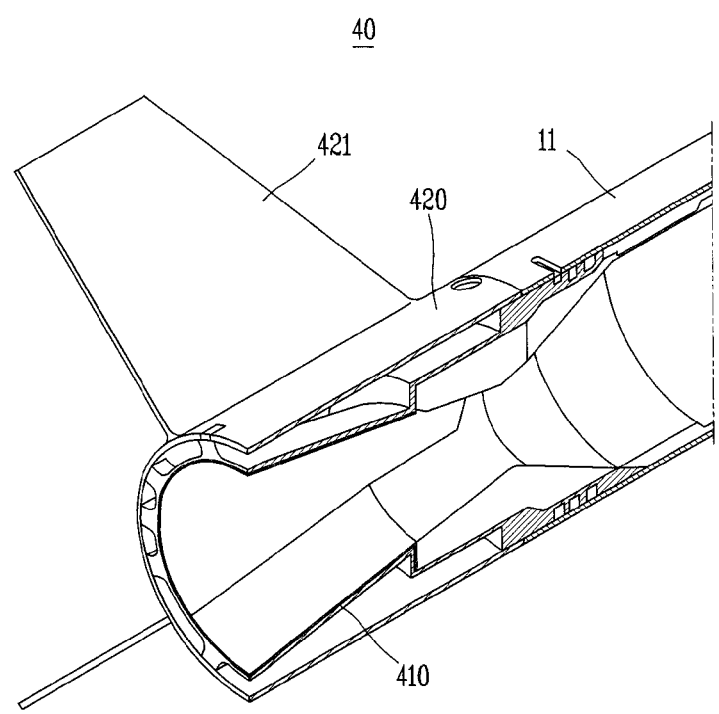
FIG. 2 illustrates a cross-sectional view taken along line A-A of the flying object of FIG. 1.
Figure 3:
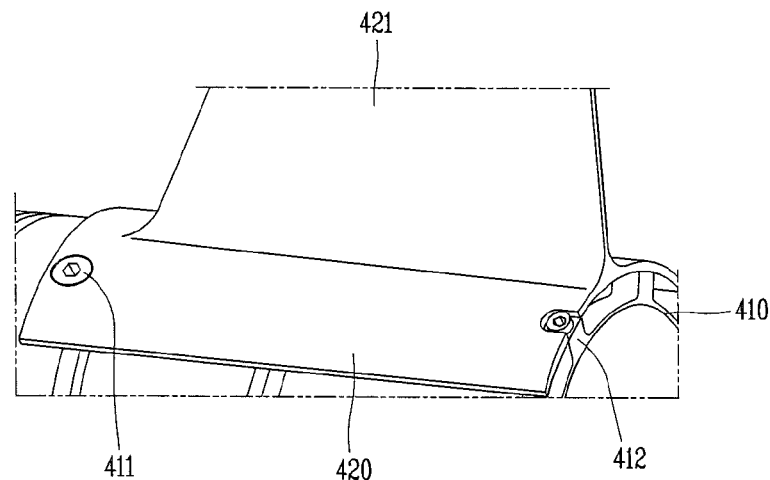
FIG. 3 illustrates a partially enlarged view of a covering-integrated wing unit according to an embodiment of the present invention.
Figure 4:
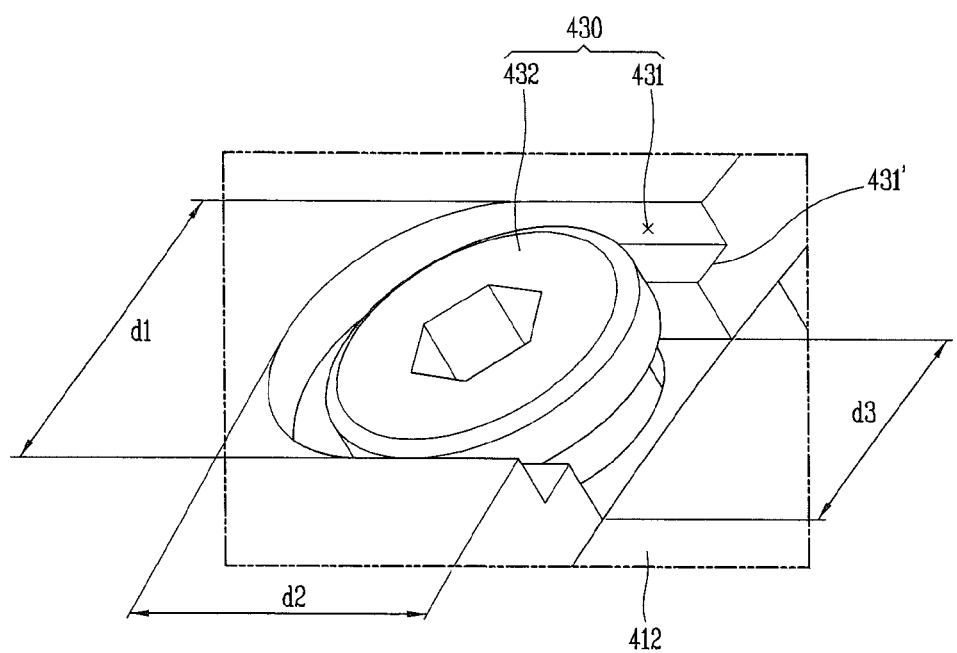
FIG. 4 illustrates an enlarged view of a fixing unit of FIG. 3.
Figure 5:
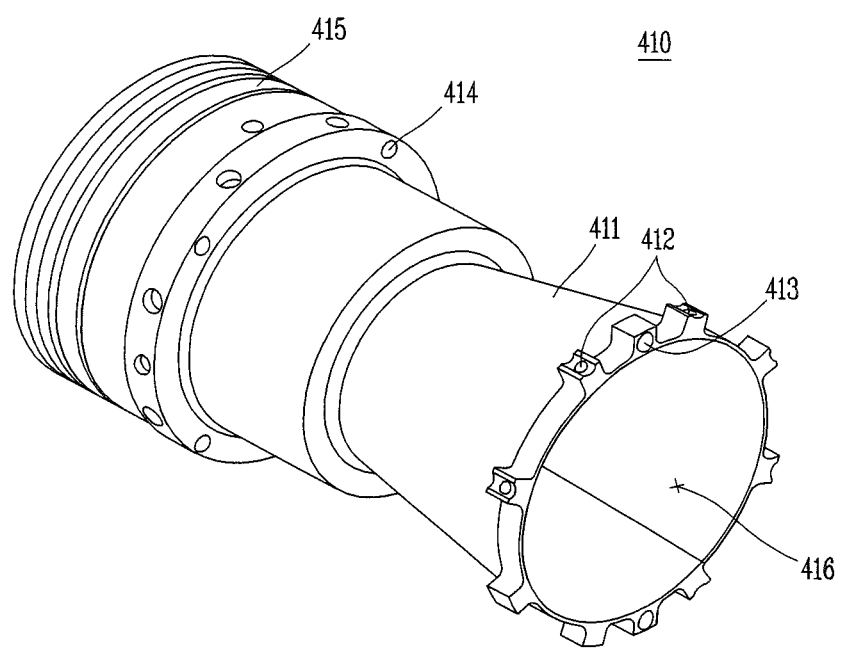
FIG. 5 illustrates a perspective view of a nozzle assembly according to an embodiment of the present invention.

FIG. 2 illustrates a cross-sectional view taken along line A-A of the flying object of FIG. 1. FIG. 3 illustrates a partially enlarged view of a covering-integrated wing unit according to an embodiment of the present invention. FIG. 4 illustrates an enlarged view of a fixing unit of FIG. 3. FIG. 5 illustrates a perspective view of a nozzle assembly according to an embodiment of the present invention.

Referring to FIGS. 2 through 4, the tail wing region 40 includes a nozzle assembly 410, a covering unit 420, and a wing unit 421. The nozzle assembly 410 is formed within the body unit 10. The nozzle assembly 410 includes inner space and is connected to a combustion tube (not shown) which burns a propellant to provide propulsion to the body unit 10.

The propellant burned in the combustion tube is discharged to the outside through the nozzle assembly 410. Propulsion is generated by the discharged propellant, and the body unit 10 moves in a direction opposite the direction in which the propellant is discharged.

Heat is generated while the combustion tube burns the propellant, and because the nozzle assembly 410 and the combustion tube may be disposed to be in contact with each other, heat emitted during the combustion process may be transmitted to the nozzle assembly 410.

The covering unit 420 is formed to cover the nozzle assembly 410. That is, the covering unit 420 has a cylindrical structure having an inner space, and a region of the nozzle assembly from which the propellant is discharged is opened. An outer surface of the covering unit 420 forms an outer surface of the body unit 10.

Meanwhile, the other region, excluding the region covered by the covering unit 420, forms a case 11. An outer surface of the case 11 is coplanar with an outer surface of the covering unit 420. That is, the case 11 and the covering unit 420 constitute an outer surface of the flying object 1.

The wing unit 421 is formed to be protruded from the outer surface of the covering unit 420. The wing unit 421 is protruded in a direction crossing the outer surface of the covering unit 420. For example, the wing unit 421 may be protruded in a direction perpendicular to the one direction.

The wing unit 421 may include at least two members. For example, as illustrated in the drawing, the wing unit 421 may include two pairs of facing members to maintain balancing of the body unit 10.

The wing unit 421 is integrally formed with the covering unit 420. The covering unit 420 and the wing unit 421 may be formed by using an extrusion molding unit.

A coupling structure for coupling the covering unit 420 and the wing unit 421 is not necessary. Thus, a configuration of the wing may be precisely processed and deformation during a coupling process can be prevented. Also, because a protrusion, a recess, and the like, formed for coupling are not formed, drag acting on the flying object while flying can be minimized.

The covering unit 420 integrally formed with the wing unit 421 is installed on an outer surface of the nozzle assembly 410.

A structure of the nozzle assembly 410 will be described with reference to FIG. 5. One end portion of the nozzle assembly 410 includes a body portion 411 having an opening 416 for discharging burnt propellant. A coupling portion 415 is formed on the other end portion of the body portion 411 and coupled to the body portion 410. The coupling portion 415 may be formed to include a screw portion to be coupled to a different structure of the body portion 410. Also, the nozzle assembly 410 may have at least one opening 414 to allow the nozzle assembly 410 to be rotatably installed in the combustion tube.

At least one fixing protrusion 412 is formed along an outer circumference of an end portion of the body portion 411. The fixing protrusion 412 is formed to be protruded from the outer circumference of the body portion 411. The fixing protrusion 412 includes a recess formed in a direction perpendicular to the outer circumferential surface of the body portion 411.

Referring to FIGS. 3 and 4, an inner surface of the covering unit 420 is disposed to be in contact with an end portion of the fixing protrusion 412. The fixing protrusion 412 is formed to be protruded from the outer circumferential surface of the nozzle assembly 410, a space is formed between the covering unit 420 and the nozzle assembly 410. That is, because the covering unit 420 is brought into contact with the fixing protrusion 412 and fixed to the nozzle assembly 410, an area in which the nozzle assembly 410 and the covering unit 420 are in contact can be minimized. Thus, heat transmitted from the nozzle assembly 410 to the covering unit 420 is minimized, thermal deformation of the covering unit 420 and the wing unit 421 connected thereto can be minimized.

In addition, the other region, excluding the portion required for coupling, is formed as an empty space to reduce weight of the nozzle assembly, thus implementing a lightweight flying object.

Meanwhile, in order to fix the covering unit 420 to the nozzle assembly 420, a fixing member 411 fixed to the nozzle assembly 410 through the covering unit 420 is formed. The fixing member 411 fixes the covering unit 420 such that the covering unit 420 does not move in a pre-set region of the nozzle assembly 420.

The fixing member 411 may be formed as a flat headed bolt. The flat headed bolt is a bolt having a plate-like shape in which an upper surface thereof is flat and a sitting surface has a conic shape. Because the upper surface of the flat headed bolt is flat, an outer surface of the covering unit 420 can be formed to be as smooth as possible. The upper surface of the flat headed bolt may be fastened to be coplanar with the outer surface of the covering unit 420. That is, a structure in which a step having a pre-set thickness is formed in a region of the covering unit 420 to which the flat headed bolt is coupled and the flat headed bolt is fastened may be included.

Thus, the nozzle assembly 410 and the covering unit 420 may be fixed by the fixing member 411, and the outer surface of the flying object 1 can smoothen by the structure of the fixing member 411, reducing drag while the flying object 1 is flying.

The fastening region 430 is disposed to be spaced apart from the fixing member 411 in one direction. The fixing member 411 and the fastening region 430 may be formed in a straight line, but the present invention is not limited thereto. The fastening region 430 prevents the covering unit 420 from being separated from the nozzle assembly 410 in a radial direction of the nozzle assembly 410. The fastening region 430 includes a fastening slit 431 and a fastening member 432.

The fastening slit 431 is formed as one region of the covering unit 420 is recessed. The fastening slit 431 is formed in a region corresponding to the fastening protrusion 412, and one surface of the fastening protrusion 412 is exposed to the outside by the fastening slit 431. Because the fastening member 432 is inserted into the fastening slit 431 and then fastened to the fastening protrusion 412, a slit width dl of the fastening slit 431 is preferably formed to be smaller than a width of a section of the fastening protrusion 412.

The fastening member 432 is inserted to the recess of the fastening protrusion 412 through the fastening slit 431. Thus, the slit width dl of the fastening slit 431 is preferably formed to be greater than a diameter of the fastening member 432.

A slit length d2 of the fastening slit 431 in the one direction is formed to be greater than a diameter of a bolt head of the fastening member 432. Also, a step 431' is formed along an inner circumference of the fastening slit 431. By the step 431', a step width d3 formed to be narrower than the slit width d1.

The step width d3 is formed to be narrower than a diameter of the bolt head. Thus, the bolt head of the fastening member 432 is fastened to overlap with the step 431'. The fastening member 432 is fastened to the fastening protrusion 412 and the bolt head of the fastening member 432 pressurizes the step 431' of the covering unit 420, whereby the covering unit 420 is prevented from being released in a radial direction of the nozzle assembly 410.

Also, because the slit length d2 is formed to be greater than a diameter of the fastening member 432, the fastening member 432 may be moved in the one direction within the fastening slit 431. Also, because one end portion of the fastening slit 431 is open, one region of the fastening member 432 may be formed to be exposed from the fastening slit 431.

Thus, when the covering unit 420 is deformed by heat, the length of the covering unit 420 may be changed in the one direction. Because the fastening member 432 and the fastening slit 431 are relatively movable, even when the covering unit 420 is deformed by heat, the fastening structure of the covering unit 420 and the nozzle assembly 410 can be maintained.

Also, because one end portion of the covering unit 420 is fixed to the fixing member 411 and the other end portion of the covering unit 420 is fixed such that the fastening member 432 is variable in a length direction, the covering unit 42 can be flexibly fixed according to deformation by heat.

The fixing member 411 and the fastening member 432 are paired, and the covering unit 420 may include at least one pair of the fixing member 411 and the fastening member 432. In order to implement a stable structure, four pairs of fixing member 411 and fastening member may be provided.

Thus, even when degrees of thermal deformation of the nozzle assembly 410 and the covering unit 420 are different, a problem that the nozzle assembly 410 and the covering unit 420 are coupled to damage a region can be prevented.

According to the flying object having a covering-integrated tail wing installed on the nozzle assembly, because the covering unit and the wing unit are integrally formed, there is no coupling structure protruded or depressed on an outer surface of the flying object. Thus, drag received by the flying object while flying can be reduced.

Also, by the coupling structure of the nozzle structure and the covering unit, thermal deformation of the covering unit is minimized and a weight of the flying object can be reduced. Also, when degrees of thermal deformation of the covering unit and the nozzle assembly are different, because the fastening member flexibly fixes the covering unit to the nozzle structure, damage to the covering unit due to deformation can be prevented.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A flying object comprising:
   a flying object body;
   a nozzle assembly formed to discharge a burnt propellant in an axial direction to provide propulsion to the flying object body;
   a covering unit formed to surround an outer circumferential surface of the nozzle assembly, wherein at least one region of the covering unit is fixed to the nozzle assembly;
   at least one wing unit protruding from an outer surface of the covering unit in a direction crossing the axial direction, the wing unit being integrated with the covering unit;
   a fastening slit formed to be recessed from at least one end portion of the covering unit;
   a fastening member penetrating the fastening slit in a radial direction perpendicular to the outer circumferential surface of the covering unit, the fastening member fastened to the outer circumferential surface of the nozzle, to prevent the covering unit from being separated from the nozzle assembly,
   wherein the nozzle assembly comprises: a cylindrical structure having an inner space; and at least one fastening protrusion, which protrudes from an outer circumferential surface of the cylindrical structure and is coupled to the fastening member.

2. The flying object of claim 1, further comprising:
   a combustion tube formed to burn the propellant by the nozzle assembly,
   wherein the combustion tube and the nozzle assembly are in contact to allow heat generated from the combustion pipe to be transmitted to the nozzle assembly.

3. The flying object of claim 1, further comprising:
a fixing member fastened to an outer circumferential surface of the nozzle assembly through the covering unit to fix the covering unit to the nozzle assembly.

4. The flying object of claim 3, wherein the fixing member comprises a flat headed bolt, and an end portion of the fixing member is coplanar with the outer circumferential surface of the covering unit.

5. The flying object of claim 1, wherein a slit length extending in the axial direction of the fastening slit is formed to be greater than a diameter of a cross section of the fastening member.

6. The flying object of claim 1, wherein the fastening slit includes a step portion protruding along an inner circumferential surface, and an end portion of the fastening member is formed to overlap with the step portion to fix the nozzle assembly and the covering unit.

7. The flying object of claim 6, wherein the end portion of the fastening member exposed to the outside of the covering unit by the fastening slot is coplanar with an outer circumferential surface of the covering unit.

8. The flying object of claim 6, wherein one end portion of the fastening slit is formed to be open, and one region of the fastening member is exposed to the outside of the fastening slit.

9. The flying object of claim 3, wherein the fastening member is formed in one end portion of the covering unit, and the fixing member is formed to be spaced apart from the fastening member in the axial direction and installed in the other end portion of the covering unit.

10. The flying object of claim 9, wherein the fastening member and the fixing member are disposed in a straight line.

11. The flying object of claim 7, wherein the flying object further comprises a case formed to partially surround the body unit of the flying object, wherein both the nozzle assembly and the covering unit are formed in the body unit.

12. The flying object of claim 11, wherein the fastening member is formed at the end of the covering unit attached to the nozzle assembly.

13. The flying object of claim 11, wherein the covering unit and the case are coplanar.

14. The flying object of claim 1, wherein the fastening protrusion and the inner circumferential surface of the covering unit are disposed to be in contact, and to limit heat transmission from the nozzle assembly to the covering unit, a space is formed between the inner circumferential surface of the covering unit and the outer circumferential surface of the nozzle assembly.

15. The flying object of claim 1, wherein the covering unit and the wing unit are integrally formed according to an extrusion molding method.

\* \* \* \* \*